(12) United States Patent
Peng et al.

(10) Patent No.: US 7,996,410 B2
(45) Date of Patent: Aug. 9, 2011

(54) WORD PLURALIZATION HANDLING IN QUERY FOR WEB SEARCH

(75) Inventors: Fuchun Peng, Sunnyvale, CA (US);
Nawaaz Ahmed, San Francisco, CA (US); Xin Li, Sunnyvale, CA (US);
Yumao Lu, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 614 days.

(21) Appl. No.: 11/701,736

(22) Filed: Feb. 1, 2007

(65) Prior Publication Data

US 2008/0189262 A1    Aug. 7, 2008

(51) Int. Cl.
*G06F 7/00*    (2006.01)

(52) U.S. Cl. ........ 707/748; 707/750; 707/736; 707/749; 709/202; 715/201

(58) Field of Classification Search ................... 707/748, 707/750, 736; 709/202; 715/201
See application file for complete search history.

(56) References Cited

U.S. PATENT DOCUMENTS

| | | | |
|---|---|---|---|
| 5,404,514 A | 4/1995 | Kageneck et al. | |
| 5,802,515 A | 9/1998 | Adar et al. | |
| RE36,727 E | 6/2000 | Kageneck et al. | |
| 6,088,692 A | 7/2000 | Driscoll | |
| 6,101,492 A | 8/2000 | Jacquemin et al. | |
| 6,480,843 B2 | 11/2002 | Li | |
| 6,772,150 B1 | 8/2004 | Whitman et al. | |
| 7,152,064 B2 | 12/2006 | Bourdoncle et al. | |
| 7,269,546 B2 | 9/2007 | Stensmo | |
| 7,287,025 B2 | 10/2007 | Wen et al. | |
| 7,440,941 B1 | 10/2008 | Borkovsky et al. | |
| 2002/0052894 A1 | 5/2002 | Bourdoncle et al. | |
| 2003/0014403 A1 | 1/2003 | Chandrasekar et al. | |
| 2003/0028512 A1 | 2/2003 | Stensmo | |
| 2003/0126235 A1 | 7/2003 | Chandrasekar et al. | |
| 2004/0158560 A1 | 8/2004 | Wen et al. | |
| 2005/0080772 A1 | 4/2005 | Bem | |
| 2006/0074853 A1* | 4/2006 | Liu et al. | 707/1 |
| 2006/0074891 A1 | 4/2006 | Chandrasekar et al. | |
| 2006/0104515 A1* | 5/2006 | King et al. | 382/190 |
| 2006/0224582 A1 | 10/2006 | Hogue | |
| 2007/0088695 A1 | 4/2007 | Bleyendaal et al. | |
| 2007/0214128 A1 | 9/2007 | Smith et al. | |
| 2008/0016050 A1 | 1/2008 | Stensmo | |

(Continued)

OTHER PUBLICATIONS

Peng, Fuchun, et al., "Context Sensitive Stemming for Web Search," 9 pgs.

(Continued)

*Primary Examiner* — Wilson Lee
*Assistant Examiner* — Tuan•Khanh Phan
(74) *Attorney, Agent, or Firm* — Hickman Palermo Truong & Becker LLP

(57) ABSTRACT

Techniques for determining when and how to transform words in a query to its plural or non-plural form in order to provide the most relevant search results while minimizing computational overhead are provided. A dictionary is generated based upon the words used in a specified number of previous most frequent search queries and comprises lists of transformations from plural to singular and singular to plural. Unnecessary transformations are removed from the dictionary based upon language modeling. The word to transform is determined by finding the last non-stop re-writable word of the query. The context of the transformed word is confirmed in the search documents and a version of the query is executed using both the original form of the word and the transformation of the word.

14 Claims, 2 Drawing Sheets

U.S. PATENT DOCUMENTS

| | | | |
|---|---|---|---|
| 2008/0025618 A1* | 1/2008 | Minagawa et al. | 382/229 |
| 2008/0114721 A1 | 5/2008 | Jones et al. | |
| 2008/0147637 A1 | 6/2008 | Li et al. | |
| 2008/0189262 A1 | 8/2008 | Peng et al. | |
| 2008/0270364 A1 | 10/2008 | Bayardo et al. | |
| 2009/0182729 A1 | 7/2009 | Lu et al. | |

OTHER PUBLICATIONS

Google, Google search results of query "running shoe". <URL: http://www.google.com/search?hl=en&client=firefox-a&rls=org. mozilla%3Aen-US%3Aofficial&q=running+shoe&btnG=Search>, Retrieved on Jan. 8, 2008, 1 page.

Carpineto, et al., "Towards More Effective Techniques for Automatic Query Expansion", Proceedings of the $3^{rd}$ European Conference on Research and Advanced Technology for Digital Libraries (ECDL 1999), Sep. 1999, 16 pages.

Shiri, et al., "Thesaurus-Assisted Search Term Selection and Query Expansion: A Review of User Centered Studies", Journal of Information Science, vol. 28, No. 2, 2002, 38 pages.

Cronen-Townsend, et al., "A Framework for Selective Query Expansion", Proceedings of the $13^{th}$ ACM Conference on Information Management and Knowledge Management (CIKM 2004), Nov. 2004, 2 pages.

Shiri et al., "Query Expansion Behavior Within a Thesaurus-Enhanced Search Environment: a User-Centered Evaluation", Journal of the American Society for Information Science and Technology, vol. 57, No. 4, Feb. 2006, 17 pages.

Perez-Aguera, et al., "Query Expansion with an Automatically Generated Thesaurus", Proceedings of the $7^{th}$ International Conference on Intelligent Data Engineering and Automated Learning (IDEAL 2006), LNCS 4224, Sep. 2006, 8 pages.

Bayardo, et al., "Content Item Identification", U.S. Appl. No. 60/915,094, filed Apr. 2007, 28 pages.

Nanba, "Query Expansion Using an Automatically Constructed Thesurus", Proceedings of the NTCIR-6 Workshop Meeting, May 2007, 6 pages.

Peng, et al., "Context Sensitive Stemming for Web Search", Proceedings of the $30^{th}$ Annual International ACM SIGIR Conference, Jul. 2007, 8 pages.

Araujo, et al., "Improving Query Expansion with Stemming Terms: A New Genetic Algorithm Approach", Proceedings of the $8^{th}$ European Conference on Evolutionary Computation in Combinatorial Optimisation (EvoCOP 2008), LNCS 4972, Mar. 2008, 12 pages.

Cronen-Townsend, S., Y. Zhou and W.B. Croft, "A Language Modeling Framework for Selective Query Expansion," Technical Report IR-338, Center for Intelligent Information Retrieval, University of Massachusetts, 2004.

Plachouras, V., B. He and I. Ounis, "University of Glasgow at TREC2004: Experiments in Web, Robust and Terabyte Tracks with Terrier," Proceedings of the $13^{th}$ Text Retreival Conference (TREC 2004), Nov. 2004.

Amati, B., C. Carpineto and G. Romano, "Query Difficulty, Robustness and Selective Application of Query Expansion," Proceedings of the Annual European Conference on Information Retrieval (ECIR '04), 2004, pp. 127-137.

Billerbeck, B., "Efficient Query Expansion,"Ph.D, Thesis, School of Computer Science and Information Technology, RMIT University, Melbourne, Victoria, Australia, Sep. 2005.

MacDonald, C., B. He, V. Plachouras and I. Ounis, "University of Glasgow at TREC 2005: Experiments in Terabyte and Enterprise Tracks with Terrier," Proceedings of the $14^{th}$ Text Retrieval Conference (TREC 2005), 2005.

He, B. and I. Ounis, "Query Performance Prediction," Information Systems, vol. 31, 2006, pp. 585-594.

U.S. Appl. No. 11/843,560, filed Aug. 22, 2007, Notice of Publication, Feb. 26, 2009.

* cited by examiner

WORD PLURALIZATION HANDLING IN QUERY FOR WEB SEARCH

FIELD OF THE INVENTION

The present invention relates to search engines, and in particular, to determining whether and how to pluralize or de-pluralize words in web search queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a computer program that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Search engines order a list of files before presenting the list to a user. To order a list of files, a search engine may assign a rank to each file in the list. When the list is sorted by rank, a file with a relatively higher rank may be placed closer to the head of the list than a file with a relatively lower rank. The user, when presented with the sorted list, sees the most highly ranked files first. To aid the user in his search, a search engine may rank the files according to relevance. Relevance is a measure of how closely the subject matter of the file matches query terms.

To find the most relevant files, search engines typically try to select, from among a plurality of files, files that include many or all of the words that a user entered into a search request. Unfortunately, the files in which a user may be most interested are too often files that do not exactly match the words that the user entered into the search request. If the user enters the singular form of a word in the search request, then the search engine may fail to select files in which the plural form of the word occurs. The reverse can occur as well and a user enters the plural form a word in a search and the search engine fails to select files in which the singular form occurs. For example, the word "shoe" is different from the word "shoes." Thus, entering the search term "shoes" would preclude all web documents that contain "shoe." As a result, the search engine may return sub-optimal results for the particular query.

Up to 50% of queries directed to web search engines possess at least one term in the search query that may be transformed either from singular to plural form or plural to singular form. However, among these 50% of queries, only 25% would benefit from pluralization or de-pluralization. Thus, a substantial number of pluralization or depluralization is not useful and should be avoided. In addition, for a good user experience when using search engines, the user will require that search engine perform searches of their queries quickly and with the most relevant results. Thus, there is a clear need for techniques to determine when and how to convert words in a query to its plural or non-plural form in order to provide the most relevant search results while minimizing computational overhead associated with the search.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Transforming certain terms in a search query to singular if the word is plural or plural if the word is singular, may often return more relevant search results. However, transforming query terms indiscriminately greatly increases computational overhead while possibly reducing the precision of the search.

In an embodiment for implementing searches with transformed plural or non-plural forms for query terms, the search engine transforms every possible word in the query to its plural or non-plural form. The search engine performs this by comparing each word in the query with entries in a dictionary. For every word where there is a match, the singular form if the word is plural, or the plural form if the word is singular, is included in the search. For example, the search query "book store location" is converted to "book OR books store OR stores location OR locations".

There are many problems using this technique. First, the results received based on the updated query has reduced precision. The large number of search words increases the probability that less relevant documents will be returned in the search result. Some less relevant documents may find their way on the final search list and may be highly ranked because non-relevant transformed words are recited in the documents.

Additionally, the computational resources, or overhead, required for the search engine to convert every word to its singular or plural form is very high. The process, as indicated above, entails searching for each query word in the dictionary, finding each word's transformation and then including the transformed word in the query. If words to transform were chosen with more precision, the computational overhead could be minimized. For example, in the query, "book store location", this implementation requires three different searches and transformations. By using more intelligent techniques that dictate that "location" would be the only possible query word to transform, the resources for two-thirds of dictionary searching and transforming words are eliminated.

Figure 1:
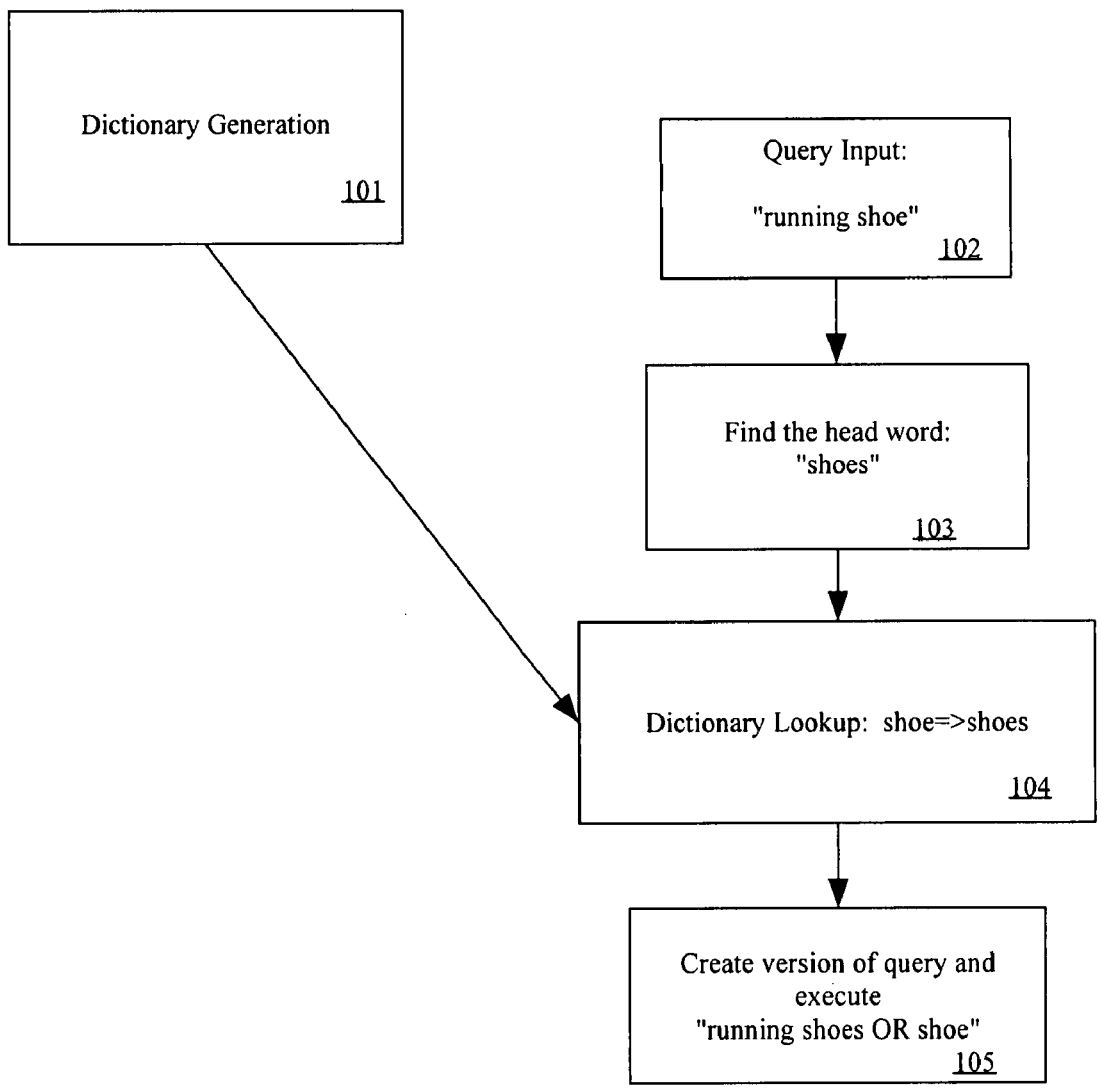
FIG. 1 is a flow diagram displaying an overview of determining when and how to transform a word in a search query to its alternate numerical form, according to an embodiment of the invention.

Determining when and how to transform an original query term to its plural or singular form is important to obtain the most relevant search results with minimal overhead. FIG. 1 is a block diagram displaying an overview of an embodiment of this technique. First, a dictionary is generated 101, based upon the most frequent previous search queries. Once a query is received from the user 102, in this example "running shoes", a determination is made to find the particular word to transform. Finding the head word 103 makes that determination, and in this example, the head word is "shoes". The selected head word is examined in the dictionary to find the transformed non-plural form of the word 104. The dictionary may or may not contain the transformation because transformations may be removed if they are found not to be relevant. Finally, a version of the query is created using the transformed word and the original form of the word which is executed 105. The version of the query may contain additional information including context requirements. To the user, this transformation is not visible and only the original submitted query is observed.

Offline Dictionary Generation

In an embodiment, a dictionary is first generated based on a specified number of the most frequent previous search queries. The advantage of using this method is that the size of the dictionary to maintain is not unnecessarily large and will contain words actually used in previous queries. The number of most frequent previous search queries upon which the dictionary is based can vary but should offer a representative sample of most queries that can be expected. One embodiment is based on 25 million most frequent previous queries. A vocabulary list is created that contains all of the query words encountered in the specified most frequent previous search queries.

In an embodiment, the stem of each word in the vocabulary list is then determined. The stem of a word is the combination of the basic form of a word, or root word, plus any suffix of the word. For example, the word "dropouts" contains the suffix -s with the stem "dropout" and the word "frequently" contains the suffix -ly with the stem "frequent". In an embodiment, the words on the vocabulary list are sent to a third party application which returns the stem of each word.

In an embodiment, once the stems of the words are found, the vocabulary word stems are retained in the dictionary if the plural form of the word either 1) follows the commonly found English rule of ending in -s, -es, or -ies, or 2) are present in a special form list. Examples of words on the special form list are "man" to "men" or "cactus" to "cacti".

Thus there is now a list of words in singular form with its transformation, or plural form counterpart. In an embodiment, transformations that are unnecessary because the relevance of search results is not improved are removed from the list. This process is determined through language modeling.

In language modeling, the conditional probability of an occurrence of a word within a web document is computed with respect to its singular or plural counterpart. A notation of language modeling is as follows:

$$\#(*,X)/\#(*,Xs) > 0.1$$

(X,*) stands for the frequency of all web documents that contain the word X occurring with any neighboring words, indicated by "*". #(Xs,*) stands for the frequency of all web documents with the transformed form of word X occurs with the same neighboring words, indicated by "*". If this probability is greater than a specified threshold, here 0.1, then the transformation will be retained by the dictionary.

The frequency of the term in web documents is found by running a query in the search engine and retaining the values for the number of web documents returned. Furthermore, if the term is contained in a web document multiple instances, the web document is only counted once.

As an example, assume X is the word "shoe", and the only neighboring word for shoe is "running". The conditional probability of "running shoe" versus "running shoes" is listed in notation as #(running shoe)/#(running shoes) and is calculated by dividing the probability of "running shoe" with the probability of "running shoes". The probability of "running shoe" is:

$$P(\text{shoe}|\text{running}) = \frac{\#(\text{running shoe})}{\#(\text{running})}$$

P(shoe|running) is the number of web documents with "running shoe" relative to the number of web documents with the term "running". The probability of "running shoes" is:

$$P(\text{shoes}|\text{running}) = \frac{\#(\text{running shoe})}{\#(\text{running})}$$

P(shoes|running) is the number of web documents with "running shoes" relative to the number of web documents with the term "running". When P(shoe|running) is divided by P(shoes|running), #(running) is canceled and the result is:

$$\frac{\#(\text{running shoe})}{\#(\text{running shoes})} = \frac{\#(\text{running shoe})}{\#(\text{running shoes})}$$

When the neighboring word is expanded to include any neighboring word, indicated by "*", the notation for the probability of shoe with any neighboring word becomes:

$$P(\text{shoe}|^*) = \frac{\#(^*\text{shoe})}{\#(^*)}$$

P(shoe|*) is the number of web documents with "shoe" relative to the number of web documents with the neighboring word term "*". However, since "*" represents multiple words, #(* shoe) is the sum of all web documents that contain "* shoe" and #(*) is the sum of all web documents that contain the neighboring words "*".

Like above, when P(shoe|*) is divided by P(shoe|*) then #(running) is canceled which results in:

$$\frac{\#(^*\text{shoe})}{\#(^*\text{shoes})} = \frac{\#(^*\text{shoe})}{\#(^*\text{shoes})}$$

Thus to find the probability of "* shoe" relative to "* shoes" is the sum total of web documents containing the word "* shoe" relative to the sum of web documents with the term "*shoes."

In an embodiment, the conditional probability threshold indicates a value where the dictionary maintains a transformation. For the transformation X, if the value of #(* X)/#(* Xs) is greater than the threshold value, the transformation is retained by the dictionary. Thus if #(* shoe)/#(* shoes) is greater than a given threshold of 0.1, then the singular "shoe" to plural "shoes" transformation is kept by the dictionary.

In another embodiment, the frequency of the term can be found in the specified number of most frequent previous search queries rather than in the web documents themselves. This also results in conditional probabilities of transformed terms but using web documents may provide more accurate results.

In an embodiment, the conditional probability is found separately for words from singular to plural and from plural to singular. Thus there are cases, assuming the above example, where the "shoe" to "shoes" transformation is retained, but the "shoes" to "shoe" transformation is discarded. This results in two separate lists of transformations, those from singular to plural and another from plural to singular.

In an embodiment, the dictionary is not updated with new search queries continuously. This may result in needless overhead for dictionary generation. Rather, the dictionary is updated on a periodic schedule so that the transformation lists are an accurate representation of query words encountered. Generation of a dictionary after the initial process may occur monthly, quarterly or any other period of time that is deemed necessary.

Finding the Word to Transform

In order to minimize overhead, a technique is used to select a word to transform rather than indiscriminately selecting all words in a query to find transformations. In an embodiment, the head word is found in the search query. The head word is the last word that can be transformed in a query that is not a stop word. A stop word is a functional word which does not carry any meaning. Examples of stop words include "a", "of", "the", "and" or "at". Ignoring the stop words conserves resources and lowers any computational costs as analysis of those words are not performed.

For example, in the query "running shoe of Peter", the query is analyzed from the end to the beginning. The first word encountered, "Peter" is not found in the offline dictionary as a word that can be transformed and so is ignored. Then "of" is identified as a stop word and is also ignored. Finally, "shoe" is found in the dictionary and can be transformed to the plural "shoes". Thus, "shoe" is the head word because "shoe" is the last word that can be transformed in a query that is not a stop word. Generally, once the head word of a query is found, any further searching for words to transform discontinues.

In an embodiment, there is an exception to the rule of transforming the head word. If the query is of the form:

X "of/from/in/at" Y where the word X is followed by any of the words "of", "from", "in" or "at" and then followed by the word Y, the head word is X only if X is not any of the words "state", "university" or "city". For example, in the query "university of Maine", transforming the word "university" to its plural "universities" produces sub-optimal search results and should be avoided.

In an embodiment, one word queries are not transformed, two to three word queries allow transformations of only one word, and queries of four words or more are allowed transformations of two words. No transformations are made in one word queries because there is no context information available to decide if the conversion is useful. Two to three word queries contain mostly a single concept and thus only one word is transformed. In longer queries, two words can be transformed and this is accomplished by first finding the last transformable word that is not a stop word. Then continuing from that point in the query, finding the next-to-last transformable word that is not a stop word.

Determine that the Transfored Word Remains within the Context of the Search and Execute the Query In another embodiment, the head word that is transformed must remain within the context of the original search. This context is ensured by requiring the transformed word and the neighboring words located in the original query to be within the same window unit. A window unit is specified by a number, and that number indicates the number of sequential words that are scanned at any given time. With a window unit of size four, four words are examined at a time.

For example, assume the following sentence is contained in a web document "Stores have many running shoes in stock" and that the original search query is "shoes store". In the example, "store" would be the transformed head word but the neighboring word in the search query, "shoes", is not within the same window unit as stores. The window unit, as indicated between '[ ]', would be "[Stores have many running] shoes in stock" or "Stores [have many running shoes] in stock". Thus, this web document would not be included in the search results.

However, if in the above example, the search query was "running shoe", the neighboring word "running" is within the same window unit as the transformed word "shoe". This is shown in "Stores have [many running shoes in] stock". Thus, this web document would be included in the search result.

This window unit technique is not limited to only pluralization handling, but can be implemented in general query expansion as well. General query expansion refers to transformations of a word that is not limited to only its plural or singular forms. The word may also be transformed into any other related words, including synonyms, different verb forms, and words with various suffixes. For example the verb "run" can be transformed to many forms such as "running", "ran", "runs", "walk" and "walking."

In an embodiment, some transformations of a word can be disallowed to participate in document selection. Queries with a plural form often indicate that general information is being sought. For example, the query "San Francisco hotels" indicates that the user is looking for information about hotels located in the city of San Francisco. However, the query "San Francisco hotel" indicates that the user is seeking information about a hotel with the name "San Francisco Hotel" which may be the San Francisco Hotel located in Mexico City. Thus, in this instance, if the query "San Francisco hotels" was given, the transformation of "hotels" to the singular form will be disallowed in document selection because the user is indicating general information, not the specific San Francisco Hotel.

In another embodiment, the document may not be included in the search result unless the original plural form of the search query is included in the web document. The previous query example, "San Francisco hotels", indicates that general information is sought for hotels. "Hotels" is the head word and is transformed to "hotel". If a web document contains the singular term "San Francisco hotel", the web document is not included in the search results unless it also contains the original plural search term "hotels".

Disallowing the word to participate in document selection does not necessarily indicate that the transformed word is not used at all. In an embodiment, the singular word may be disallowed during document selection but may be used separately in the ranking the documents after the documents have already been selected. In this case, the search engine performs a search by retrieving web documents first, and then ranking them after they are retrieved. In another embodiment, the singular form of the word may not used in any context by the search engine.

In an embodiment, a version of the query is generated that contains both the original form of the word and the transformation. The window size and the indication to disallow the singular word is also included in this version of the query. Document selection and the final ranking of those web documents are executed based upon this version. In another embodiment, the version of the query is not visible to the user. Only the original query that the user submitted is visible.

Hardware Overview

Figure 2:
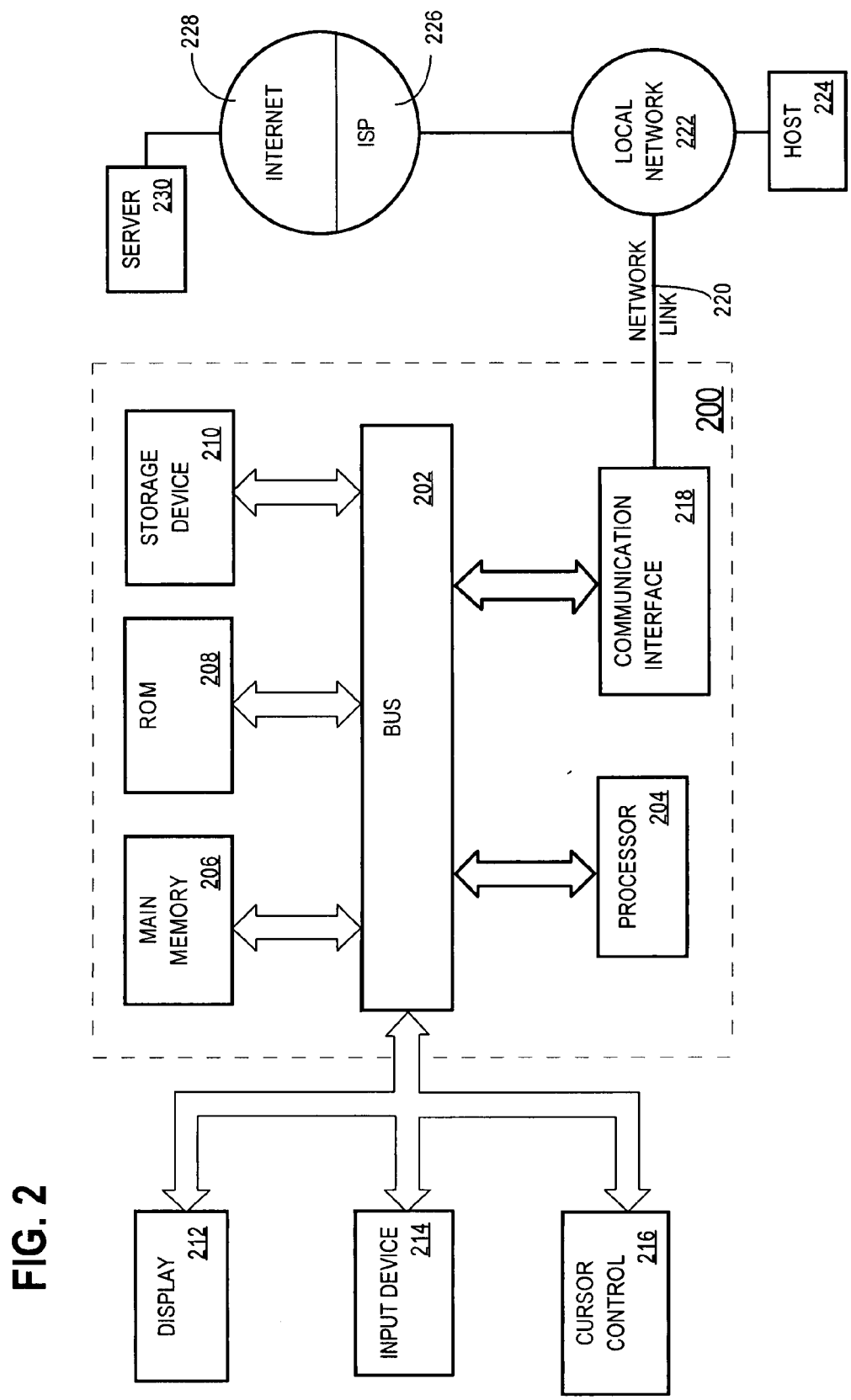
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   generating a dictionary comprising (a) one or more transformations of words from singular to plural form and (b) one or more transformations of words from plural to singular form;
   counting a first number of times that a certain word appears in a set of two or more separate web documents, wherein the certain word is a singular form of the word;
   counting a second number of times that a transformation of the certain word appears in the set of two or more separate web documents, wherein the transformation of the certain word is a plural form of the certain word;
   computing a probability by either (a) dividing the second number by the first number or (b) dividing the first number by the second number,
   removing, from the dictionary, the certain word and the transformation of the certain word in response to determining that the probability is below a particular value;
   receiving a particular query from a user comprising a plurality of words;
   based on the particular query, determining whether a particular word in the particular query occurs in the dictionary;
   selecting from the dictionary a transformation of the particular word; and
   generating results based on executing a version of the particular query that includes both the particular word and the transformation of the particular word;
   wherein the method is performed by one or more computing devices.

2. The method of claim 1, wherein the dictionary is based upon words used in a certain number of previous most frequent search queries.

3. The method of claim 1, wherein the particular word in the particular query is the last non-stop rewritable word of the particular query.

4. The method of claim 1, wherein the results comprise of documents containing the transformation of the particular word placed within a specified number of words, of words neighboring the particular word in the particular query.

5. The method of claim 1, wherein the version of the particular query comprises an indicator that disallows the transformation to participate in document selection.

6. The method of claim 1, wherein more than one particular word is transformed in the version of the particular query.

7. The method of claim 1, wherein determining whether a particular word in the particular query occurs in the dictionary further comprises the steps:
   determining whether the particular query is in a form comprising a first word, a second word and a third word;
   wherein the second word is a word from a set of words comprising "of", "from", "in" and "at"; and
   the first word is not a word from a set of words comprising "state", "university" and "city";
   selecting the first word as the particular word; and
   determining whether the first word occurs in the dictionary.

8. A non-transitory machine-readable medium carrying one or more sequences of instructions which, when executed by one or more processors, causes the one or more processors to perform the method recited in claim 1.

9. A non-transitory machine-readable medium carrying one or more sequences of instructions which, when executed by one or more processors, causes the one or more processors to perform the method recited in claim 2.

10. A non-transitory machine-readable medium carrying one or more sequences of instructions which, when executed by one or more processors, causes the one or more processors to perform the method recited in claim 3.

11. A non-transitory machine-readable medium carrying one or more sequences of instructions which, when executed by one or more processors, causes the one or more processors to perform the method recited in claim 4.

12. A non-transitory machine-readable medium carrying one or more sequences of instructions which, when executed by one or more processors, causes the one or more processors to perform the method recited in claim 5.

13. A non-transitory machine-readable medium carrying one or more sequences of instructions which, when executed by one or more processors, causes the one or more processors to perform the method recited in claim 6.

14. A non-transitory machine-readable medium carrying one or more sequences of instructions which, when executed by one or more processors, causes the one or more processors to perform the method recited in claim 7.

* * * * *